(12) United States Patent
Onishi et al.

(10) Patent No.: US 9,867,031 B2
(45) Date of Patent: *Jan. 9, 2018

(54) MOBILE COMMUNICATION SYSTEM, MOBILE STATION, SWITCHING STATION, AND LOCATION REGISTRATION METHOD FOR MOBILE STATION

(71) Applicant: NEC Corporation, Tokyo (JP)

(72) Inventors: Koji Onishi, Tokyo (JP); Toshiyuki Tamura, Tokyo (JP); Hidenobu Sasaki, Tokyo (JP); Jyunya Okabe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/171,308

(22) Filed: Feb. 3, 2014

(65) Prior Publication Data

US 2014/0148160 A1 May 29, 2014

Related U.S. Application Data

(62) Division of application No. 13/824,895, filed as application No. PCT/JP2012/070421 on Aug. 10, 2012.

(30) Foreign Application Priority Data

Aug. 12, 2011 (JP) ................................. 2011-176557

(51) Int. Cl.
*H04W 8/06* (2009.01)
*H04W 60/00* (2009.01)
(Continued)

(52) U.S. Cl.
CPC ............. *H04W 8/06* (2013.01); *H04W 60/00* (2013.01); *H04W 64/00* (2013.01); *H04W 8/04* (2013.01); *H04W 8/065* (2013.01)

(58) Field of Classification Search
CPC ....... H04W 8/06; H04W 8/065; H04W 64/00; H04W 60/00; H04W 8/04; H04M 3/00
See application file for complete search history.

(56) References Cited

U.S. PATENT DOCUMENTS 8,208,453 B2 * 6/2012 Tao ............................... 370/338
8,238,909 B2 * 8/2012 Guo et al. .................. 455/435.1
(Continued)

FOREIGN PATENT DOCUMENTS

CA 2813220 A1 2/2013
CN 1913715 A 2/2007
(Continued)

OTHER PUBLICATIONS

Digital cellular Telecommunications system (Phase 2+); Universal Mobile Telecommunications System (UMTS); LTE; Intra-Domain Connection of Radio Access Network (RAN) nodes to Multiple Core Network (CN) Nodes (3GPP TS 23.236 version 9.0.0 Release 9); Jan. 2010; ETSI TS 123 236 V9.0.0.*

(Continued)

*Primary Examiner* — Jenee Holland
*Assistant Examiner* — Latresa McCallum
(74) *Attorney, Agent, or Firm* — Foley & Lardner LLP

(57) ABSTRACT

A decrease is realized in network load caused by a change in selection of location registration device or an increase or decrease in the number of installations, on a circuit switching network side. A mobile communication system includes a mobile station, a packet switching station, and a plurality of location registration devices that perform location management of the mobile station. With respect to the mobile station, after one location registration device is already selected from among the plurality of location registration devices, when the mobile station performs location registration, an NRI (Network Resource Identifier) included in a (Continued)

TMSI (Temporary Mobile Station Identifier) is transmitted to the packet switching station. The packet switching station makes a request for location registration with respect to the one location registration device, based on the NRI.

11 Claims, 13 Drawing Sheets

(51) Int. Cl.
*H04W 64/00* (2009.01)
*H04W 8/04* (2009.01)

(56) References Cited

U.S. PATENT DOCUMENTS

| | | | |
|---|---|---|---|
| 8,428,590 | B2 | 4/2013 | Guo et al. |
| 8,520,596 | B2 | 8/2013 | Diachina et al. |
| 8,929,895 | B2 | 1/2015 | Zhang et al. |
| 2002/0087575 | A1* | 7/2002 | Papadimitriou ........ H04W 8/12 |
| 2003/0139182 | A1 | 7/2003 | Bakkeby et al. |
| 2005/0037812 | A1 | 2/2005 | Hsu et al. |
| 2005/0221823 | A1 | 10/2005 | Noguchi et al. |
| 2005/0227690 | A1* | 10/2005 | Noguchi et al. ........... 455/435.1 |
| 2006/0256749 | A1 | 11/2006 | Rexhepi et al. |
| 2007/0091877 | A1* | 4/2007 | Lundin et al. ............... 370/353 |
| 2007/0207806 | A1 | 9/2007 | Shaheen |
| 2008/0096547 | A1* | 4/2008 | Zhang et al. ................ 455/424 |
| 2009/0082023 | A1* | 3/2009 | Gustavsson ......... H04L 12/5695 455/445 |
| 2009/0124248 | A1 | 5/2009 | Ohnishi et al. |
| 2009/0209252 | A1* | 8/2009 | Han ........................ H04W 8/04 455/433 |
| 2009/0305668 | A1* | 12/2009 | Ahn ...................... H04W 12/06 455/410 |
| 2010/0035609 | A1 | 2/2010 | Hui et al. |
| 2010/0080171 | A1 | 4/2010 | Rune et al. |
| 2010/0105386 | A1 | 4/2010 | Guo |
| 2010/0177663 | A1 | 7/2010 | Johansson et al. |
| 2010/0220680 | A1* | 9/2010 | Ramankutty ......... H04W 68/08 370/329 |
| 2010/0254313 | A1 | 10/2010 | Hallenstal et al. |
| 2010/0303041 | A1 | 12/2010 | Diachina et al. |
| 2011/0021216 | A1 | 1/2011 | Pudney et al. |
| 2011/0117946 | A1* | 5/2011 | Vainola et al. ............... 455/509 |
| 2011/0312313 | A1 | 12/2011 | Hiraga et al. |
| 2012/0040643 | A1* | 2/2012 | Diachina et al. ............. 455/411 |
| 2012/0077498 | A1 | 3/2012 | Guo |
| 2012/0220297 | A1* | 8/2012 | Hu ............................. 455/435.1 |
| 2014/0146791 | A1 | 5/2014 | Onishi et al. |

FOREIGN PATENT DOCUMENTS

| | | |
|---|---|---|
| CN | 101026564 A | 8/2007 |
| CN | 101305626 A | 11/2008 |
| CN | 101309513 A | 11/2008 |
| CN | 101610504 A | 12/2009 |
| CN | 101771991 A | 7/2010 |
| CN | 101888698 A | 11/2010 |
| EP | 2282561 A1 * | 2/2011 |
| EP | 2 490 479 A1 | 8/2012 |
| JP | 2010-537523 A | 12/2010 |
| JP | 2011-508496 A | 3/2011 |
| JP | 2012-178630 A | 9/2012 |
| RU | 2421941 C2 | 6/2011 |
| TW | 201325133 A | 6/2013 |
| WO | WO-2007/058024 A1 | 5/2007 |
| WO | WO-2009/081268 A1 | 7/2009 |
| WO | WO 2009/133894 A1 | 11/2009 |
| WO | WO 2010/039085 A1 | 4/2010 |

OTHER PUBLICATIONS

Non-final office action dated Jun. 4, 2014 in co-pending U.S. Appl. No. 13/824,895 (25 pgs.).
3GPP TS 23.236 Technical Specification, Intra-Domain Connection of Radio Access Network (RAN) Nodes to Multiple Core Network (CN) Nodes (Release 10), Jan. 2011, 39 pages, Ver. 10.2.1.
3GPP TS 23.272 Technical Specification, Circuit Switched (CS) Fallback in Evolved packet System (EPS); Stage 2 (Release 10), Jun. 2011, 35 pages, Ver. 10.4.0.
3rd Generation Partnership Project (3GPP) et al., TR 23.913 Turbo-Charger Technical Report, Version 1.0.0, Dec. 13, 1999, pp. 6-18.
Office Action dated Aug. 12, 2014 in co-pending U.S. Appl. No. 14/171,315 (42 pgs.).
Final Office Action dated Sep. 24, 2014 in co-pending U.S. Appl. No. 13/824,895 (24 pgs.).
Decision on Grant in related Russian application No. 2013118276 dated Dec. 4, 2014 with English-language translation (18 pgs.).
Final office action dated Mar. 3, 2015 in co-pending U.S. Appl. No. 14/171,315 (27 pgs.).
Non-final office action dated Mar. 12, 2015 in co-pending U.S. Appl. No. 13/824,895 (25 pgs.).
Non-final Office Action dated Apr. 21, 2016 in co-pending U.S. Appl. No. 13/824,895 (25 pgs.).
Office Action dated Jul. 20, 2016 in related Taiwanese Appl. No. 104134764 with partial English-language translation (16 pages).
Office Action dated Oct. 14, 2016 in related Canadian Appl. 2,896,065 (4 pgs.).
Office Action dated Oct. 17, 2016 in related Canadian Appl. 2,896,067 (4 pgs.).
Office action dated Dec. 26, 2016 in related Taiwanese Appl. No. 104134764 with English-language translation (14 pgs.).
Non-final Office Action dated Apr. 6, 2017 in related U.S. Appl. No. 13/824,895 (23 pgs.).
Office Action dated Mar. 13, 2017 in related Chinese Appl. No. 201410280287.8 with English-language translation (34 pgs.).
Non-final Office Action dated Oct. 19, 2015 in related U.S. Appl. No. 13/824,895 (19 pgs.).
Non-final Office Action dated Oct. 19, 2015 in related U.S. Appl. No. 14/171,315 (18 pgs.).
Final Office Action dated Sep. 11, 2017 in related U.S. Appl. No. 13/824,895 (20 pgs.).
Non-Final Office Action dated Sep. 15, 2017 in related U.S. Appl. No. 15/684,458 (13 pgs.).
Non-Final Office Action dated Sep. 21, 2017 in related U.S. Appl. No. 14/171,315 (35 pgs.).

\* cited by examiner

MOBILE COMMUNICATION SYSTEM, MOBILE STATION, SWITCHING STATION, AND LOCATION REGISTRATION METHOD FOR MOBILE STATION

CROSS-REFERENCE TO RELATED APPLICATIONS

This application is a continuation of U.S. application Ser. No. 13/824,895, filed Mar. 18, 2013, which claims benefit of priority from the prior Japanese patent application No. 2011-176557 filed on Aug. 12, 2011, the disclosures of which are incorporated herein in their entirety by reference thereto.

TECHNICAL FIELD

The present invention relates to a mobile communication system, a mobile station, a switching station, and a location registration method for a mobile station, and in particular to a mobile communication system, a mobile station, a switching station, and a location registration method for a mobile station, in which are arranged a plurality of location registration devices that perform location management of a mobile station on a circuit switching network side.

BACKGROUND

Non Patent Literature (NPL) 1 discloses a specification for a function known as CS (Circuit Switched) fallback that implements cooperation between LTE (Long Term Evolution) and a 3G circuit switching service. Furthermore, the article "4.3.2 MME" of page 11 of the same literature discloses that, in a case of a configuration of an MSC/VLR (Mobile Switching Center/Visited Location Register) pool where a plurality of MSC/VLRs provide service with the same Location Area Identity, an MME (Mobility Management Entity) is to select a MSC/VLR by an IMSI Hash method of Non Patent Literature 2. It is to be noted that the IMSI Hash method is a method to obtain a hash by a modulo operation, with an IMSI (International Mobile-Station Subscription Identifier) that is an identifier for uniquely identifying a subscriber within a network and the number of MSC/VLRs inside a network as two keys.

Patent Literature (PTL) 1 discloses that when UE (User Equipment) initially accesses an SGSN (Serving GPRS Support Node) pool or the like, a RAN node such as an e-NodeB selects a suitable CN (Core Network) node for the UE in accordance with a NNSF (Non Access Stratum Node Selection Function) and a load splitting (distribution) rule. In addition, Patent Literature 1 discloses that a RAN node finds and selects a CN (Core Network) node where the UE is originally registered, by using an NRI (Network Resource Identifier) inside a TMSI (Temporary Mobile Station Identifier) included in an initial direct forwarding message received by the UE. That is, as long as the UE of Patent Literature 1 moves within a pool, the CN node does not change.

Patent Literature 2 discloses an MME in which, for the MME where a tracking area update request (TAU request) from a UE is converted to a location area update request (LAU request), a location area update response (LAU response) including an NRI is received from an MSC and is converted to a tracking area update response (TAU response) for the UE.

CITATION LIST

Patent Literature

PTL 1:
Japanese Patent Kohyo Publication No. JP2010-537523A
PTL 2:
Japanese Patent Kohyo Publication No. JP2011-508496A Non-Patent Literature NPL 1:
3GPP TS 23.272 ver "Circuit Switched (CS) fallback in Evolved Packet System (EPS); Stage 2 (Release 10)", [searched on Jun. 20, 2011], Internet <http://www.3gpp.org/ftp/Specs/html-info/23272.htm>
NPL 2:
3GPP TS 23.236 ver "Intra-domain connection of Radio Access Network (RAN) nodes to multiple Core Network (CN) nodes (Release 10)", [searched on Jun. 20, 2011], Internet <http://www.3gpp.org/ftp/Specs/html-info/23236.htm>

SUMMARY

Technical Problem

The following analysis is given by the present invention. An IMSI Hash method described in Non Patent Literature 2 is used in a case where a UE moves from a pre UE movement packet switching station (written below as "old packet switching station") to another packet switching station (written below as "new packet switching station"), and the new packet switching station selects a location registration device (MSC/VLR) that carries out location registration.

At this time, if a Location Area of a movement destination of the UE is within the range of the same location registration device pool (MSC/VLR pool), even if the IMSI Hash is used, the new packet switching station can select the same location registration device (MSC/VLR) as the location registration device (MSC/VLR) that was selected by the old packet switching station and which has completed location registration. In this way, by implementing location registration without movement of the location registration device (MSC/VLR), it is possible to realize a decrease in network load.

In particular, in a case where a packet switching station works together with the location registration device (MSC/VLR) with a goal of delivering an SMS (Short Message Service), since the location registration devices (MSC/VLR) form a relatively large location registration device pool (MSC/VLR pool), an effect is realized in that the network load described above is decreased even more.

However, in a case where a failure occurs in a path between a location registration device (MSC/VLR) to be selected and the old switching station, the old packet switching station may select another location registration device (MSC/VLR) as shown in FIG. 12 (refer to S902 to S904 in FIG. 12). Thereafter, when the UE moves to the new packet switching station and makes a Location Registration Request, the new packet switching station selects the location registration device (MSC/VLR) using the IMSI Hash method (refer to S911 to S912 in FIG. 12). At this time, since in the IMSI Hash method a hash is obtained by a modulo operation, with an IMSI and the number of MSC/VLRs as described above as two keys, the new switching station selects the same location registration device (MSC/VLR) as in S902 in FIG. 12 (refer to S911 to S912 in FIG. 12). As a result, since a location registration device (MSC/VLR) which has not completed location registration is selected, unnecessary signal messages are exchanged within the network.

Moreover, as shown in FIG. 13, when the number of MSC/VLRs belonging to a location registration device pool (MSC/VLR pool) increases or decreases, since the location registration device (MSC/VLR) selected by the IMSI Hash changes, re-selection of the location registration device (MSC/VLR) is performed by most UEs for which location registration has already been done, resulting in congestion of the overall network.

It is to be noted that in Patent Literatures 1 and 2, there is clearly no disclosure of a configuration of selecting a location registration device configuring the location registration device pool as described above, and after the mobile station has moved, of selecting a location registration device which has completed location registration.

It is an object of the present invention to provide a mobile communication system, a mobile station, a switching station, and a location registration method for a mobile station, by which it is possible to curb the exchange of unnecessary signal messages and network congestion, caused by a change in selection of location registration device or an increase or decrease in the number of installations, on a circuit switching network side of the abovementioned location registration devices (MSC/VLR).

Solution to Problem

According to a first aspect of the present invention there is provided a mobile communication system, comprising: a mobile station, a packet switching station, and a plurality of location registration devices that perform location management of the mobile station, wherein: with respect to the mobile station, after one location registration device is already selected from among the plurality of location registration devices, an NRI (Network Resource Identifier) included in a TMSI (Temporary Mobile Station Identifier) is transmitted to the packet switching station when the mobile station performs location registration, and the packet switching station makes a request for location registration with respect to the one location registration device, based on the NRI.

According to a second aspect of the present invention there is provided a mobile station, used in a mobile communication system comprising a packet switching station and a plurality of location registration devices that perform location management of the mobile station, wherein: with respect to the mobile station, after one location registration device is already selected from among the plurality of location registration devices, an NRI (Network Resource Identifier) included in a TMSI (Temporary Mobile Station Identifier) is transmitted to the packet switching station when location registration is performed on a packet network side.

According to a third aspect of the present invention there is provided a packet switching station, used in a mobile communication system comprising a mobile station and a plurality of location registration devices that perform location management of the mobile station, wherein: with respect to the mobile station, after one location registration device is already selected from among the plurality of location registration devices, a request for location registration is made to the one location registration device, based on an NRI (Network Resource Identifier) included in a TMSI (Temporary Mobile Station Identifier), received from the mobile station when location registration is performed on a packet network side by the mobile station.

According to a fourth aspect of the present invention there is provided a location registration device, included in a mobile communication system comprising a mobile station, a packet switching station, and a plurality of location registration devices that perform location management of the mobile station, wherein: with respect to the mobile station, after the location registration device is already selected from among the plurality of location registration devices, a Location Registration Request is received from the packet switching station, based on an NRI (Network Resource Identifier) included in a TMSI (Temporary Mobile Station Identifier), received when location registration is performed on a packet network side by the mobile station.

According to a fifth aspect of the present invention there is provided a location registration method for a mobile station in a mobile communication system comprising the mobile station, a packet switching station, and a plurality of location registration devices that perform location management of the mobile station, the method comprising: a step of selecting one location registration device from among the plurality of location registration devices, with respect to the mobile station; a step of transmitting an NRI (Network Resource Identifier) included in a TMSI (Temporary Mobile Station Identifier) to the packet switching station, when location registration is performed by the mobile station; a step of making a request by the packet switching station for location registration with respect to the one location registration device, based on the NRI; and a step in which the one location registration device receives a Location Registration Request from the packet switching station. This method is associated with particular machines referred to as a location registration device, a packet switching station, and a mobile station, as described above.

Advantageous Effects of Invention

According to the present invention, it is possible to curb the exchange of unnecessary signal messages and network congestion, caused by a change in selection of location registration device, or an increase or decrease in the number of installations, on a circuit switching network side.

MODES

First a description is given of an outline of an exemplary embodiment of the present invention, making reference to the drawings. It is to be noted that reference symbols in drawings attached to this outline are added for convenience to respective elements, as an example in order to aid understanding, and are not intended to limit the invention to modes of the drawings shown.

Figure 1:
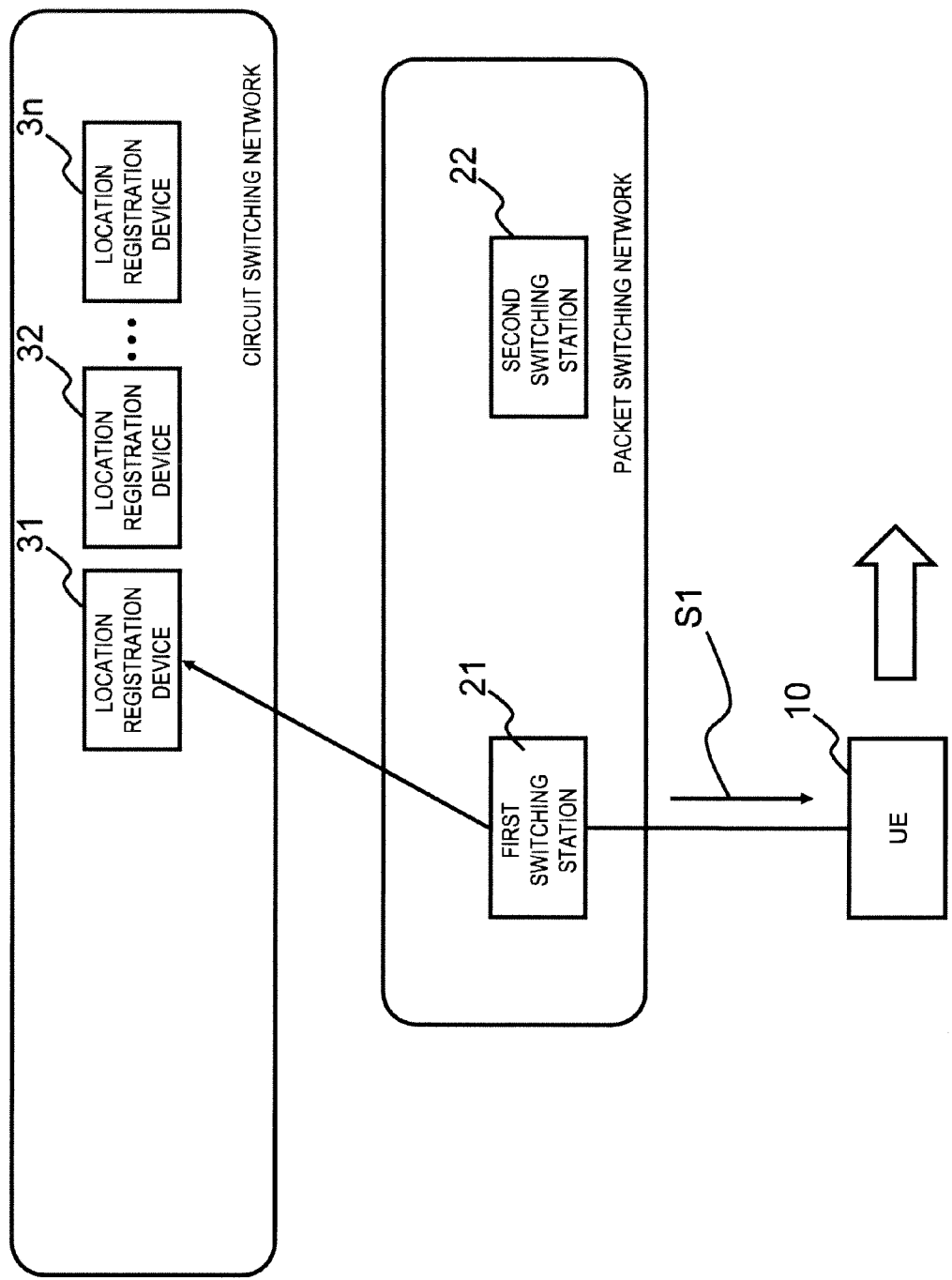
FIG. 1 is a diagram for describing a configuration of an exemplary embodiment of the present invention.

The present invention, in an exemplary embodiment thereof as shown in FIG. 1, can be realized by a configuration including: a plurality of location registration devices 31 to 3n that perform location management of a mobile station on a circuit switching network side; a first switching station (a first packet switching station) 21 that, on receiving a Location Registration Request from a UE (mobile station) 10, selects one location registration device from among the plurality of location registration devices 31 to 3n in accordance with a prescribed rule and requests location registration; the UE (mobile station) 10; and a second switching station (a second packet switching station) 22 that is located at a movement destination of the mobile station.

Figure 2:
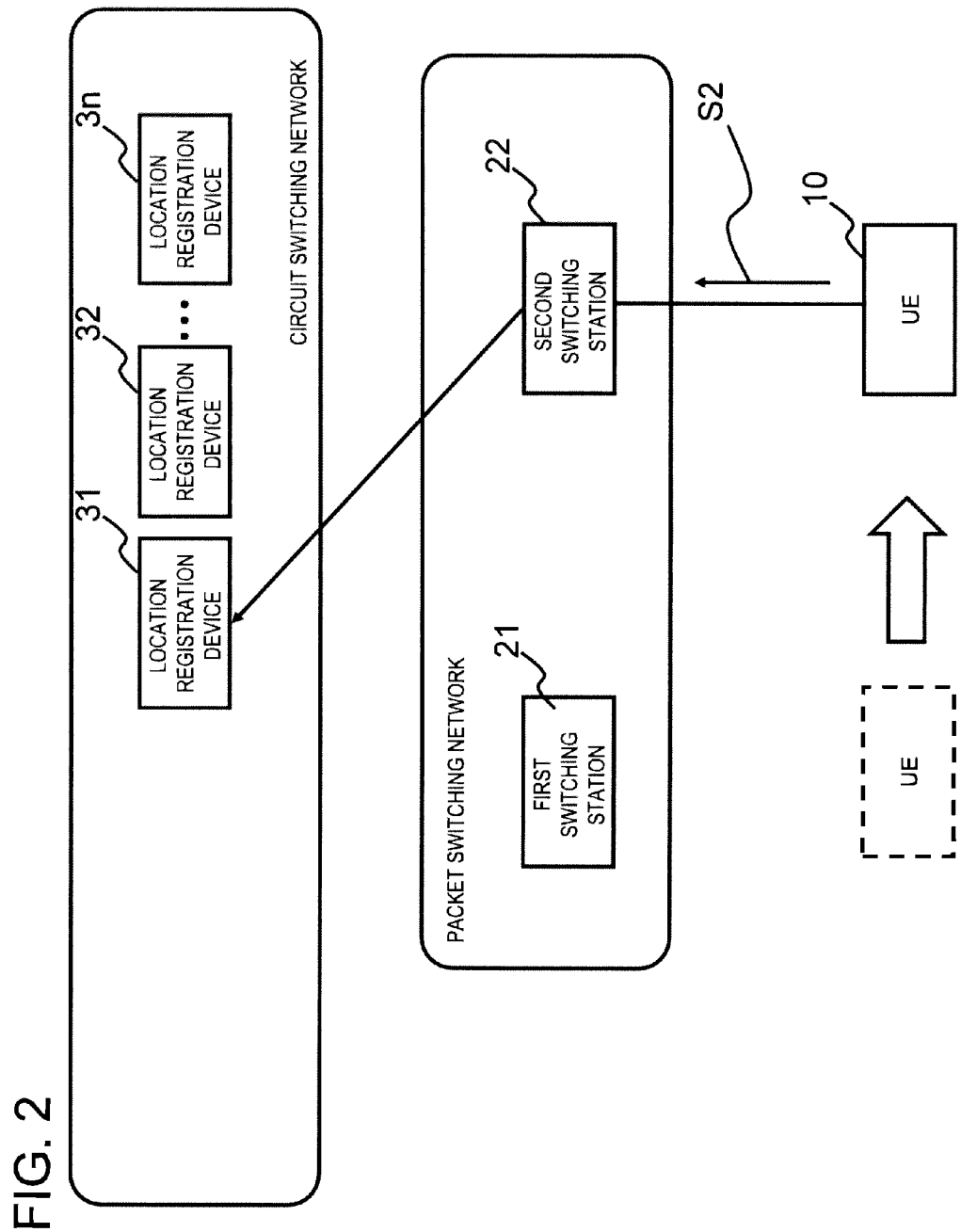
FIG. 2 is a continuation diagram of FIG. 1.

Specifically, the UE (mobile station) 10 receives a Location Response including information S1 for identifying a location registration device selected by the first switching station (first packet switching station) 21, from the first switching station (first packet switching station) 21. As shown in FIG. 2, with movement from a service area of the first switching station (first packet switching station) 21 to a service area of the second switching station (second packet switching station) 22, the UE (mobile station) 10 transmits a Location Registration Request including information S2 for identifying a location registration device selected by the first switching station (first packet switching station) 21 to the second switching station (second packet switching station) 22. The second switching station (second packet switching station) 22 makes a request for location registration to the location registration device 31 for which the first packet switching station has performed location registration for the mobile station, based on the information S1 included in the Location Registration Request.

As described above, according to the present invention, the second switching station (second packet switching station) 22 also performs a selection of a location registration device in which the first switching station (first packet switching station) 21 has actually performed location registration. Accordingly, it is possible to curb the exchange of unnecessary signal messages and network congestion, caused by a change in selection of location registration device or an increase or decrease in the number of installations, on a circuit switching network side of the mobile station. It is to be noted that in a case where the information S2 included in the Location Registration Request indicates that the UE (mobile station) 10 is registered in a location registration device other than the location registration devices 31 to 3n (a location registration device not belonging to the pool in question), the second switching station (second packet switching station) 22, similar to the first switching station (first packet switching station) 21, selects one location registration device from among the plurality of location registration devices 31 to 3n, and requests location registration.

First Exemplary Embodiment

Figure 3:
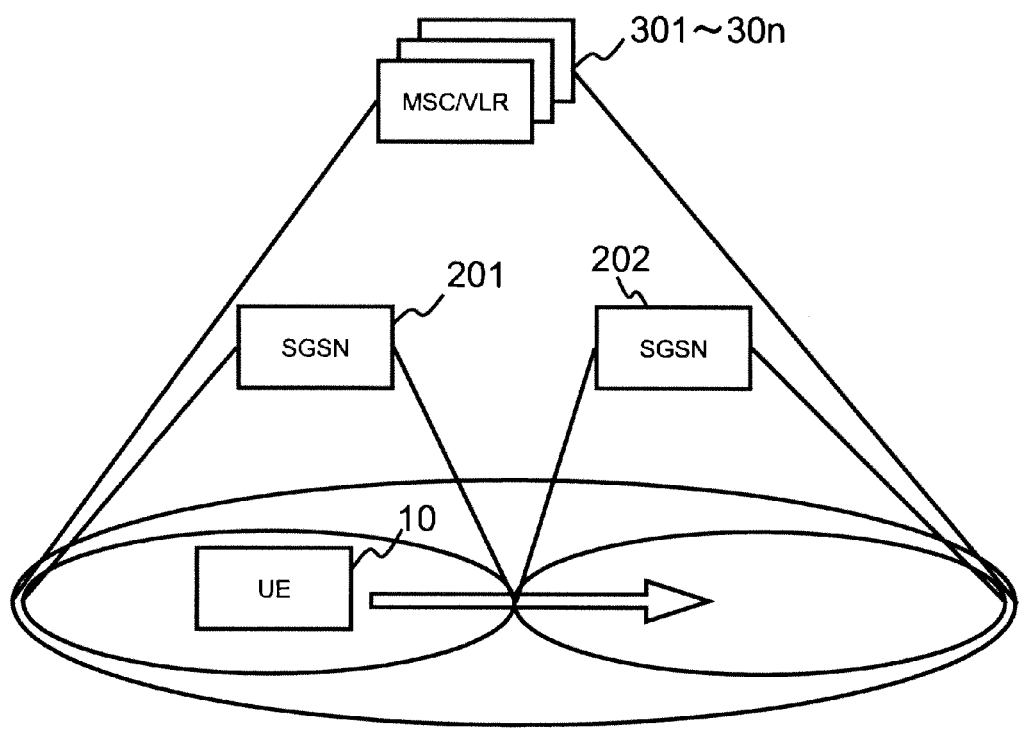
FIG. 3 is a diagram for describing a configuration of a first exemplary embodiment of the present invention.

Next, detailed descriptions are given concerning first to fourth exemplary embodiments of the present invention using a NRI (Network Resource Indicator) as information for identifying a location registration device, making reference to the drawings. FIG. 3 is a diagram that schematically represents a configuration of a first exemplary embodiment of the present invention.

Referring to FIG. 3, a network configuration is shown that includes a plurality of MSC/VLRs 301 to 30n that form a MSC/VLR pool for performing location management of a UE (mobile station) 10 on a circuit switching network side, and SGSNs 201 and 202 that perform movement management or authentication processing of the UE 10 arranged on the circuit switching network side. It is to be noted that in the example of FIG. 3 various types of RAN node and various types of gateway that are described in Patent Literature 1 are omitted. In the MSC/VLR pool, the plurality of MSC/VLRs are configured to provide a service for the same Location Area (LA).

On receiving a Location Registration Request from the UE 10, the SGSN 201 (202) selects an MSC/VLR to perform location registration for the UE 10, from the MSC/VLRs 301 to 30n in accordance with a prescribed rule such as an IMSI Hash method of Non Patent Literature 2 or the like, and requests location registration. The selected MSC/VLR transmits a Location Response including a TMSI (Temporary Mobile Station Identifier) via the SGSN 201 (202) to the UE 10.

The TMSI includes an NRI distributed to an MSC/VLR. The NRI is an information item by which the MSC/VLR can be uniquely identified within the MSC/VLR pool.

By providing the NRI to the new SGSN 202 (201) when a request for location registration is made, the UE 10 makes the SGSN 202 (201) select a MSC/VLR for which location registration is done. At this time, in a case where the MSC/VLR indicated by the NRI is an MSC/VLR within the same MSC/VLR pool, since all the SGSNs hold a common configuration for selecting a MSC/VLR from the NRI, the SGSN 202 (201) restrains change of the MSC/VLR, and before moving, the UE 10 makes a request for location registration to the MSC/VLR for which location registration is done.

Figure 4:
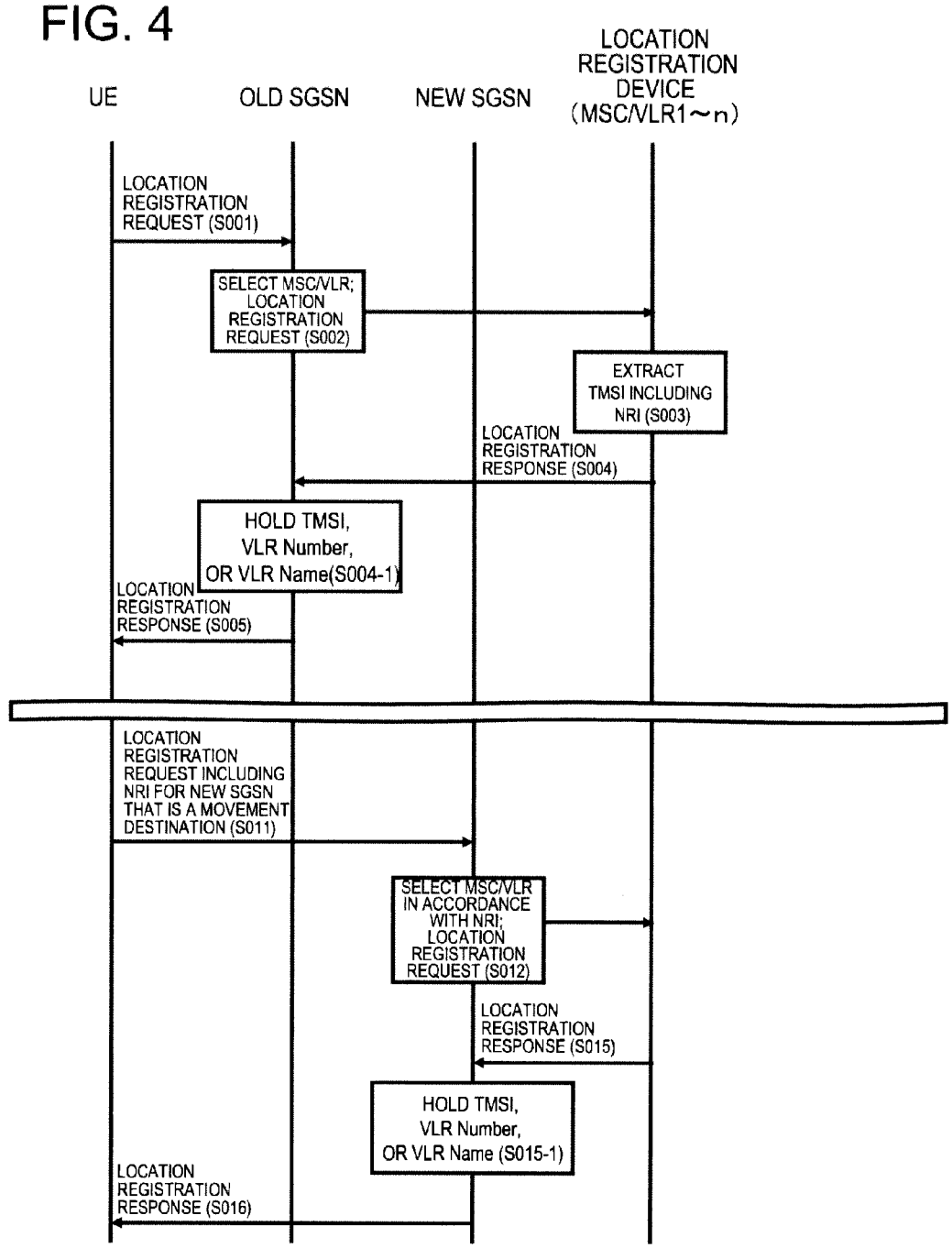
FIG. 4 is a sequence diagram for describing operation of the first exemplary embodiment of the present invention.

Next, a detailed description is given concerning operation of the present exemplary embodiment, making reference to the drawings. FIG. 4 is a sequence diagram for describing operation of the first exemplary embodiment of the present invention. It is to be noted that in the description below, SGSN 201 is referred to as "old SGSN" and SGSN 202 is referred to as "new SGSN".

Referring to FIG. 4, first, the UE 10 transmits a Location Registration Request (Attach Request, Routing Area Update Request, or the like) to the old SGSN (S001 in FIG. 4). The old SGSN that receives the Location Registration Request selects an MSC/VLR using the IMSI Hash method of Non Patent Literature 2, and transmits a Location Registration Request (S002 in FIG. 4).

The MSC/VLR that receives the Location Registration Request carries out location registration of the UE 10, and in addition assigns a TMSI including an NRI corresponding to itself (S003 in FIG. 4), Furthermore, the MSC/VLR transmits a Location Response to the old SGSN (S004 in FIG. 4).

The old SGSN holds the TMSI included in the Location Response or VLR Name or VLR Number (S004-1 in FIG. 4). Thereafter, the old SGSN transmits a Location Response (Attach Accept, Routing Area Update Accept, or the like) including the TMSI to the UE 10 (S005 in FIG. 4).

Thereafter, in a case where the UE 10 moves to under the control of a new SGSN, the UE 10 transmits the NRI included in the TMSI to the new SGSN, and makes a Location Registration Request (Attach Request, Routing Area Update Request, or the like) (S011 in FIG. 4).

The new SGSN that receives the Location Registration Request transmits the Location Registration Request to an MSC/VLR corresponding to the NRI, requested by a TMSI included in the Location Registration Request (S012 in FIG. 4).

The MSC/VLR that receives the Location Registration Request performs only updating of a Location Area since location registration has already been done for the UE 10, and responds with a Location Response (S015 in FIG. 4).

The new SGSN holds the TMSI included in the Location Response or the VLR Name or the VLR Number (S015-1 in FIG. 4). The new SGSN responds with a Location Response (Attach Accept, Routing Area Update Accept, or the like) to the UE 10, based on a Location Response received from the MSC/VLR (S016 in FIG. 4).

As described above, according to the present exemplary embodiment, the new SGSN 202 selects the MSC/VLR for which the old SGSN 201 has performed location registration. As a result, for example, it is possible to perform location registration of the UE 10 to the same MSC/VLR, without being affected if a failure occurs in a path between the old SGSN 201 and the MSC/VLR initially selected by the old SGSN 201, or a change occurs in the number of MSC/VLRs. As a result, no unnecessary messages flow in the network and a decrease in network load is realized.

Second Exemplary Embodiment

Figure 5:
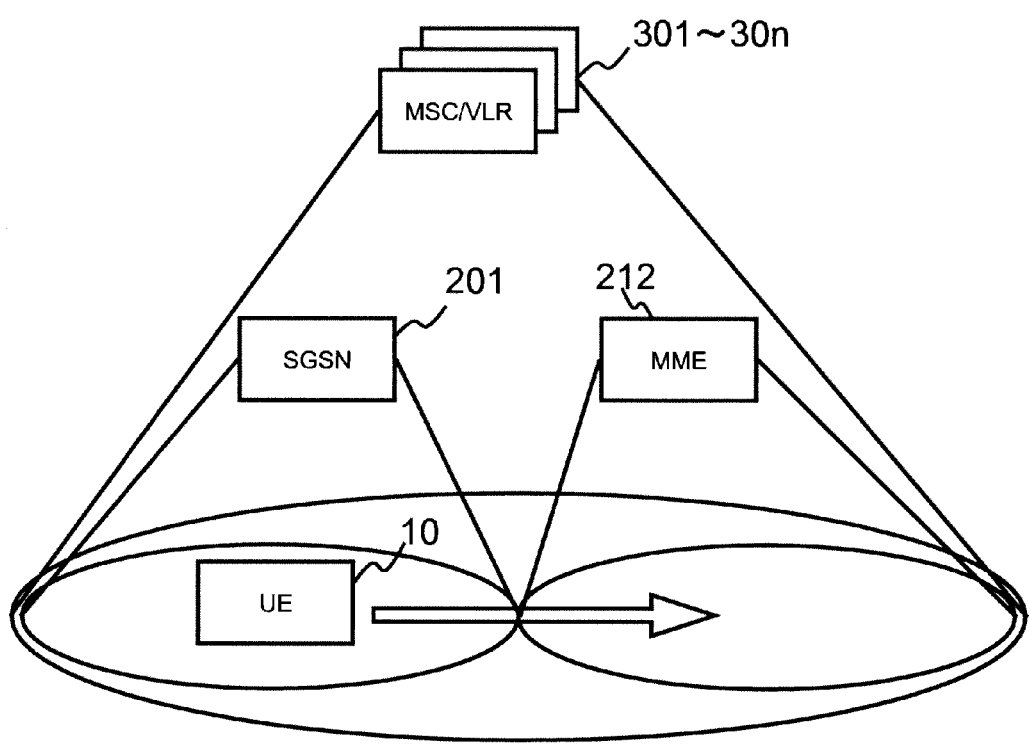
FIG. 5 is a diagram for describing a configuration of a second exemplary embodiment of the present invention.

Next, a description is given concerning a second exemplary embodiment of the present invention, in which the new SGSN (SGSN 202) of the first exemplary embodiment described above is replaced by an MME. FIG. 5 is a diagram schematically representing a configuration of the second exemplary embodiment of the present invention. A point of difference from the first exemplary embodiment shown in FIG. 3 is that the SGSN 202 is replaced by the MME 212.

The MME 212 is a switching station arranged on a packet switching network side, and performs movement management and authentication processing of a UE 10 similar to the SGSN described above.

Figure 6:
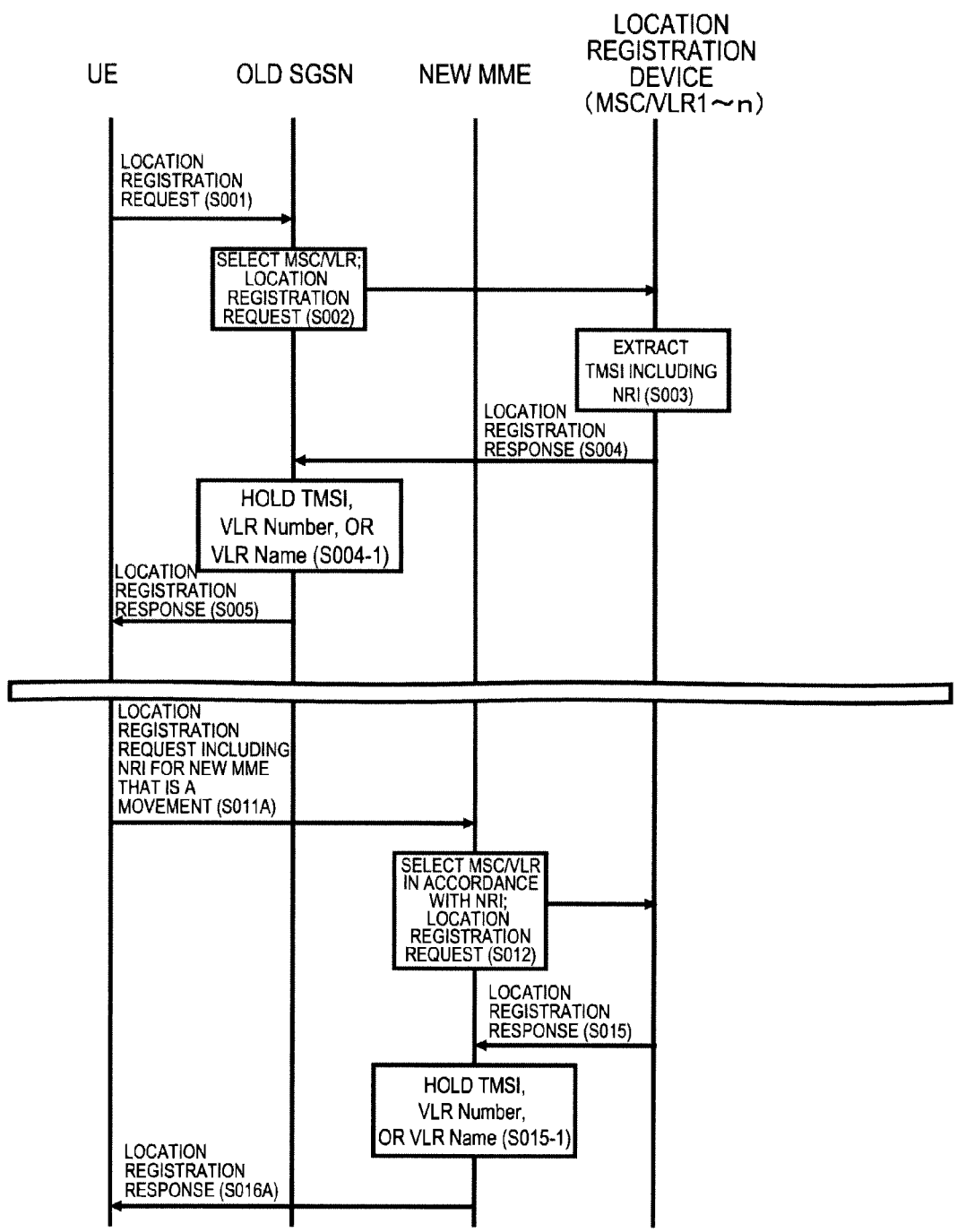
FIG. 6 is a sequence diagram for describing operation of the second exemplary embodiment of the present invention.

Next, a detailed description is given concerning operation of the present exemplary embodiment, making reference to the drawings. FIG. 6 is a sequence diagram for describing operation of the second exemplary embodiment of the present invention. It is to be noted that in the description below, SGSN 201 is referred to as "old SGSN" and MME 212 is referred to as "new MME".

Operation of the present exemplary embodiment is different in the point that the new SGSN of the first exemplary embodiment is replaced by the new MME, and specifically the point that, in S011A of FIG. 6, the UE 10 transmits a Location Registration Request (Attach Request, Tracking Area Update Request, or the like) to the new MME, and in S016A of FIG. 6, the new MME transmits a Location Response (Attach Accept, Tracking Area Update Accept, or the like) to the UE 10. Basic operation is otherwise the same as in the first exemplary embodiment, and a description is omitted.

As described above, the present invention can be applied to a case where the UE 10 moves from under the control of the old SGSN to under the control of the MME, and the new MME can be made to make a Location Registration Request to a location registration device in which the old SGSN has actually performed location registration.

Third Exemplary Embodiment

Figure 7:
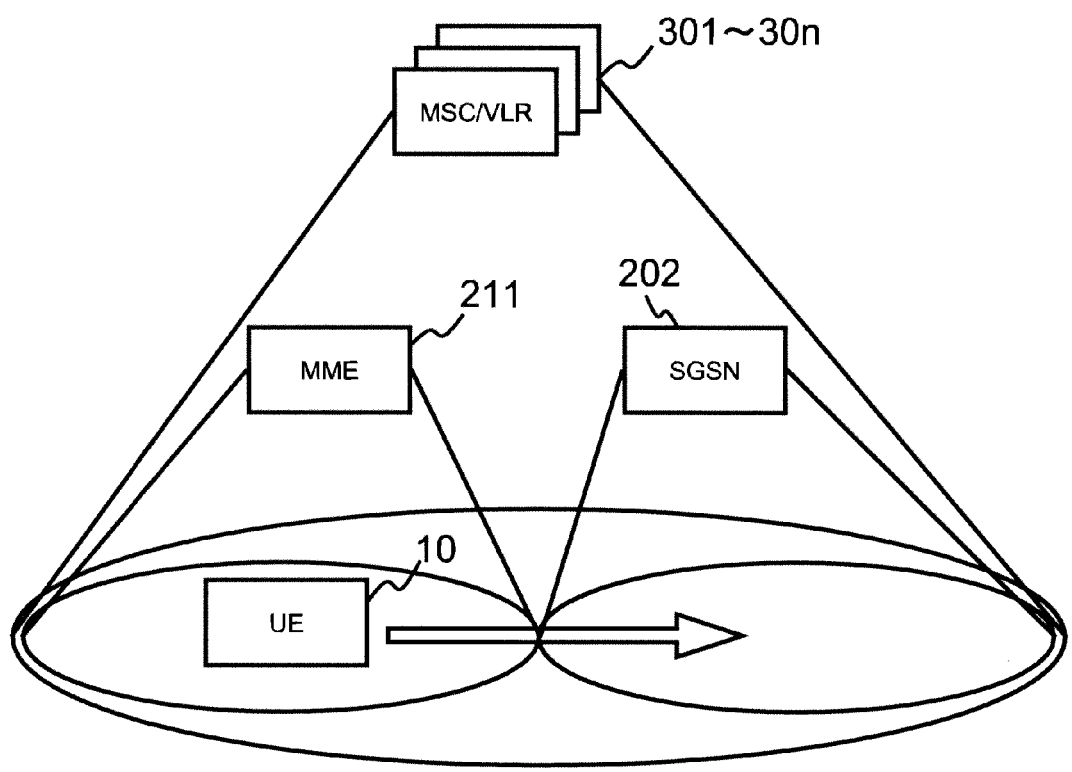
FIG. 7 is a diagram for describing a configuration of a third exemplary embodiment of the present invention.

Next, a description is given concerning a third exemplary embodiment of the present invention, in which the old SGSN (SGSN 201) of the first exemplary embodiment described above is replaced by an MME. FIG. 7 is a diagram schematically representing a configuration of the third exemplary embodiment of the present invention. A point of difference from the first exemplary embodiment shown in FIG. 3 is that the SGSN 201 is replaced by the MME 211.

The MME 211 is a switching station arranged on a packet switching network side, and performs movement management and authentication processing of a UE 10 similar to the SGSN described above.

Figure 8:
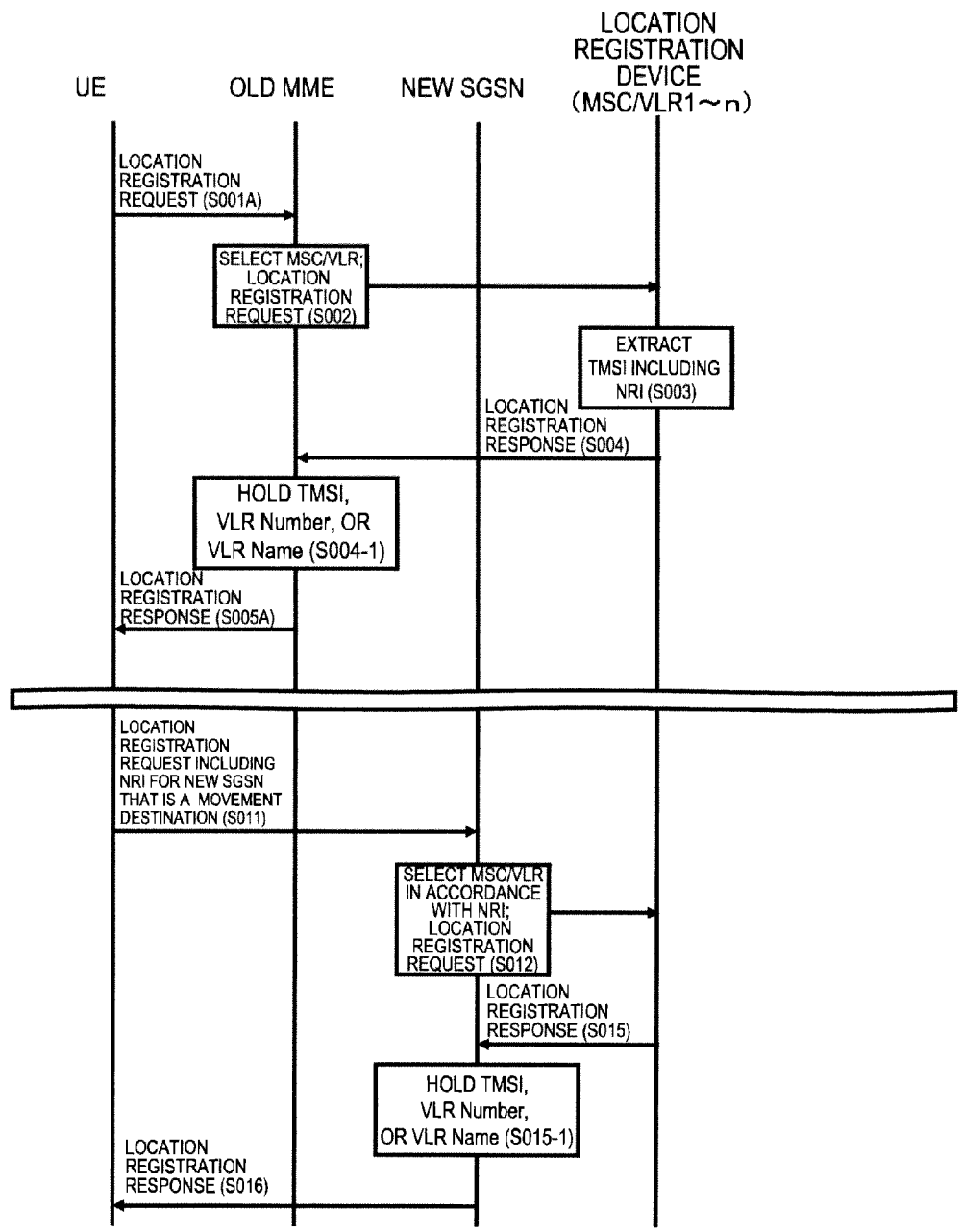
FIG. 8 is a sequence diagram for describing operation of the third exemplary embodiment of the present invention.

Next, a detailed description is given concerning operation of the present exemplary embodiment, making reference to the drawings. FIG. 8 is a sequence diagram for describing operation of the third exemplary embodiment of the present invention. It is to be noted that in the description below, the MME 211 is referred to as "old MME" and SGSN 202 is referred to as "new SGSN".

Operation of the present exemplary embodiment is different in the point that the old SGSN of the first exemplary embodiment is replaced by the old MME, and specifically the point that, in S001A of FIG. 8, the UE 10 transmits a Location Registration Request (Attach Request, Tracking Area Update Request, or the like) to the old MME, and in S005A of FIG. 8, the old MME transmits a Location Response (Attach Accept, Tracking Area Update Accept, or the like) to the UE 10. Basic operation is otherwise the same as in the first exemplary embodiment, and a description is omitted.

As described above, the present invention can be applied to a case where the UE 10 moves from a state under the control of the old MME to under the control of the SGSN, and the new SGSN can be made to make a Location Registration Request to a location registration device in which the old MME has actually performed location registration.

Fourth Exemplary Embodiment

Figure 9:
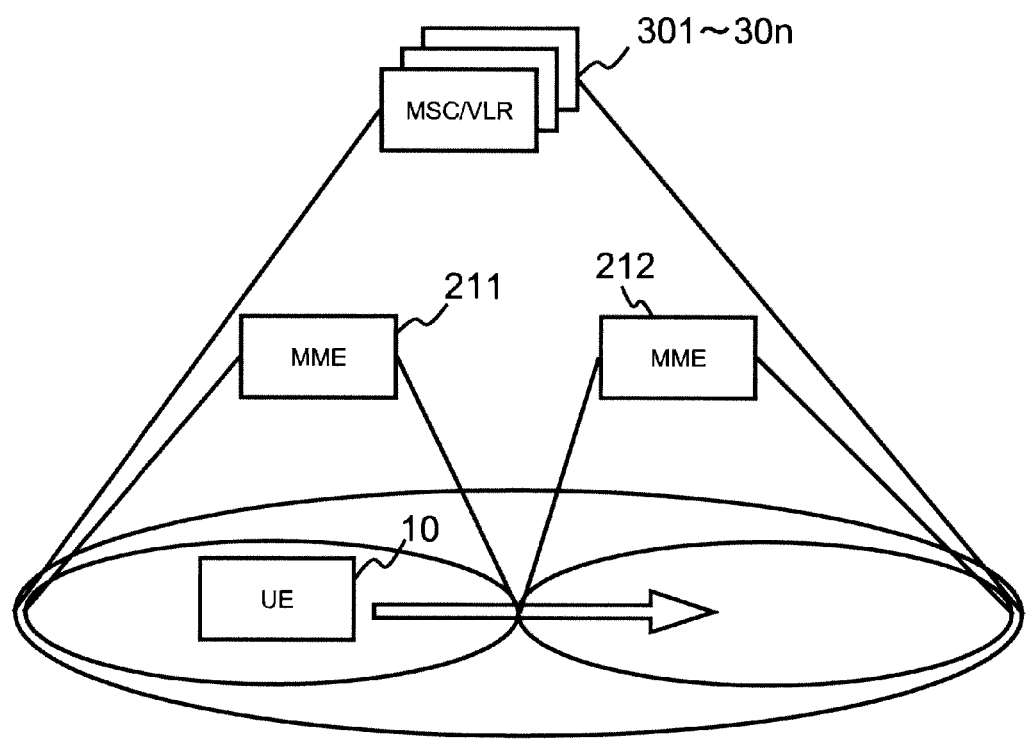
FIG. 9 is a diagram for describing a configuration of a fourth exemplary embodiment of the present invention.

Next, a description is given concerning a fourth exemplary embodiment of the present invention, in which the old SGSN (SGSN 201) and the new SGSN (SGSN 202) of the first exemplary embodiment described above are replaced by MMEs. FIG. 9 is a diagram schematically representing a configuration of the fourth exemplary embodiment of the present invention. A point of difference from the first exemplary embodiment shown in FIG. 3 is that the SGSNs 201 and 202 are replaced by the MMEs 211 and 212.

The MMEs 211 and 212 are switching stations arranged on a packet switching network side, and perform movement management and authentication processing of a LIE 10 similar to the SGSN described above.

Figure 10:
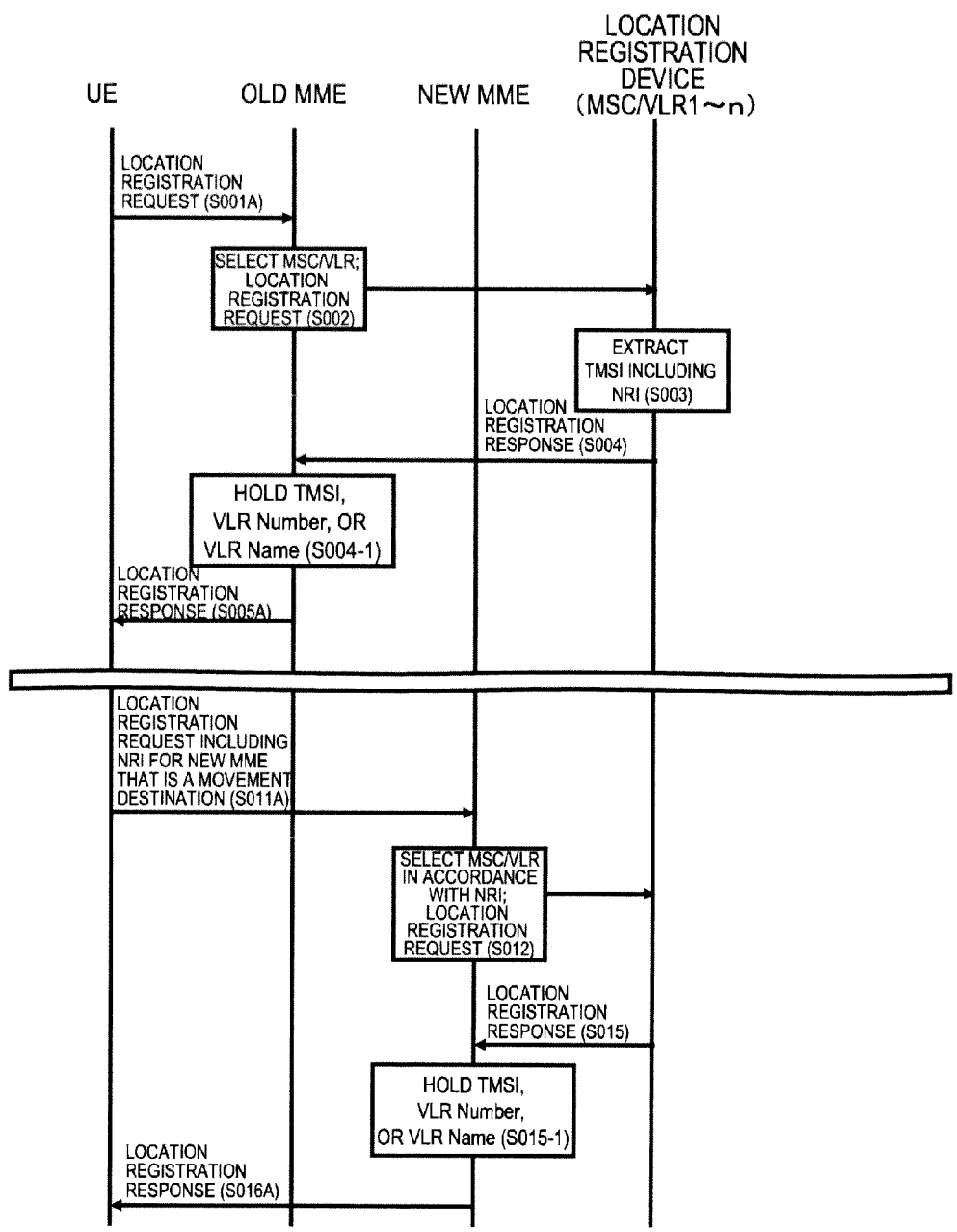
FIG. 10 is a sequence diagram for describing operation of the fourth exemplary embodiment of the present invention.

Next, a detailed description is given concerning operation of the present exemplary embodiment, making reference to the drawings. FIG. 10 is a sequence diagram for describing operation of the fourth exemplary embodiment of the present invention. It is to be noted that in the following description, the MME 211 is referred to as "old MME", and the MME 212 is referred to as "new MME".

Operation of the present exemplary embodiment is different in the point that the old SGSN and the new SGSN of the first exemplary embodiment are respectively replaced by the old MME and the new MME, and specifically the point that, in S001A and S011A of FIG. 10, the UE 10 transmits a Location Registration Request (Attach Request, Tracking Area Update Request, or the like) to the new and old MMEs, and in S005A and S016A of FIG. 10, the new and old MMEs transmit a Location Response (Attach Accept, Tracking Area Update Accept, or the like) to the UE 10. Basic operation is otherwise the same as in the first exemplary embodiment and a description is omitted.

As described above, the present invention can be applied to a case where the UE 10 moves from a state under the control of the old MME to under the control of an MME, and the new MME can be made to make a Location Registration Request to a location registration device in which the old MME has actually performed location registration.

Fifth Exemplary Embodiment

In the abovementioned first to fourth exemplary embodiments, information identifying an MSC/VLR in which location registration has been completed is transmitted to a new switching station via a UE 10, but it is possible to also use a configuration in which an old switching station transmits information identifying an MSC/VLR in which location registration has been done directly to a new switching station.

Below, a description is given concerning a fifth exemplary embodiment of the present invention in which it is possible to select an MSG/VLR in which location registration has been done with respect to the UE 10 in question, without using an NRI from the UE 10. Since the present invention can be realized by a configuration similar to the first to fourth exemplary embodiments described above, the following description is centered on points of difference in operation thereof. Furthermore, the following description relates to a configuration having an old MME and a new MME as shown in FIG. 9.

Figure 11:
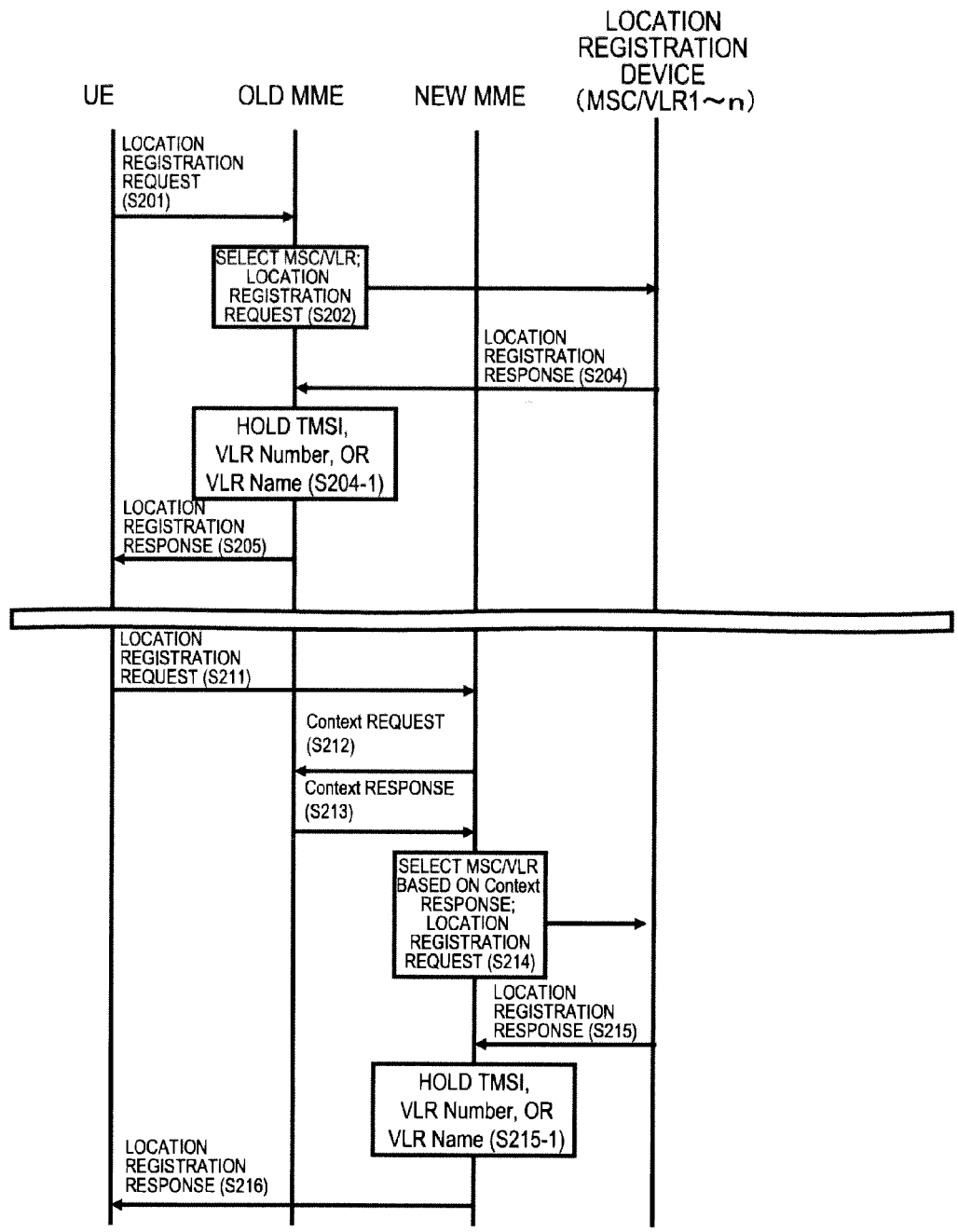
FIG. 11 is a sequence diagram for describing operation of a fifth exemplary embodiment of the present invention.
Figure 12:
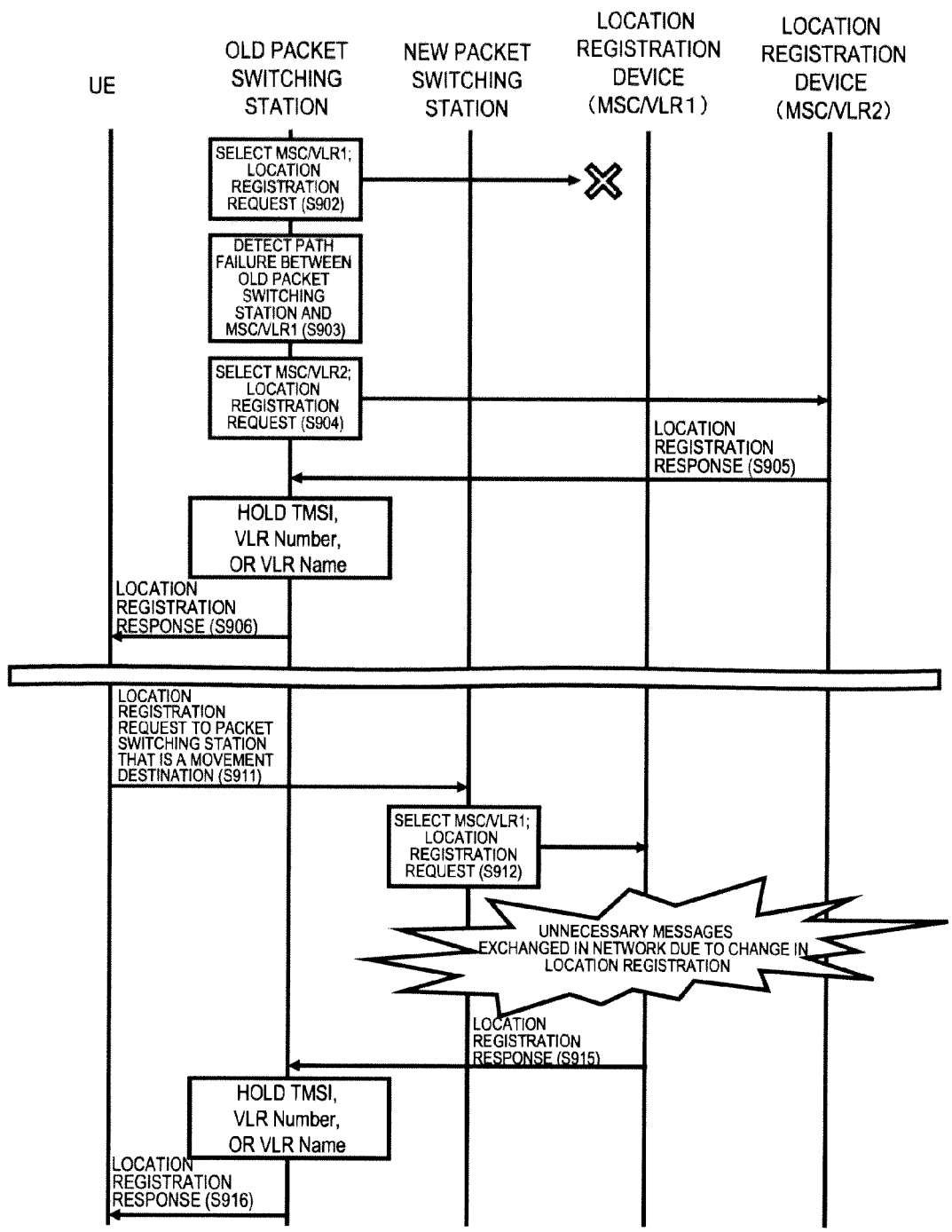
FIG. 12 is a diagram for describing flow of location registration processing according to methods of Non Patent Literatures 1 and 2.
Figure 13:
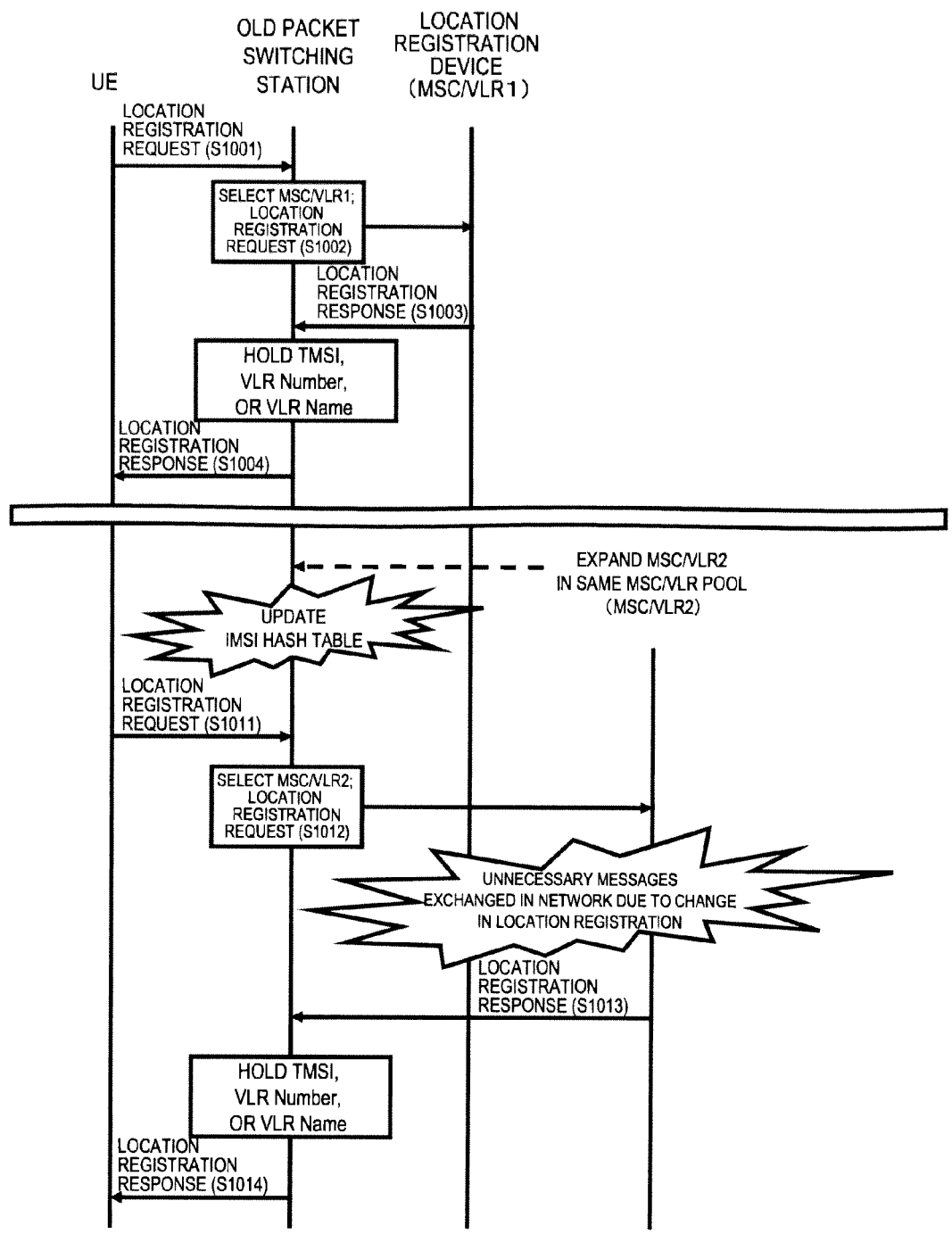
FIG. 13 is a diagram for describing flow of location registration processing according to methods of Non Patent Literatures 1 and 2.

FIG. 11 is a sequence diagram for describing operation of the fifth exemplary embodiment of the present invention. It is to be noted that in the following description, an MME 211 is referred to as "old MME", and an MME 212 is referred to as "new MME".

Referring to FIG. 11, first, the UE 10 transmits a Location Registration Request (Attach Request, Tracking Area Update Request, or the like) to the old MME (S201 in FIG. 11). The old MME that has received the Location Registration Request selects an MSC/VLR using the IMSI Hash method of Non Patent Literature 2 or the like, and transmits a Location Registration Request (S202 in FIG. 11).

The MSC/VLR that receives the Location Registration Request carries out location registration of the UE 10, and transmits a Location Response (S204 in FIG. 1). The old MME transmits a Location Response (Attach Accept, Tracking Area Update Accept, or the like) to the UE 10 (S205 in FIG. 11). It is to be noted that an NRI need not be included in the Location Response here. Furthermore, the old MME holds a VLR Name or VLR Number of a transmission source of the Location Response (S204-1 of FIG. 11).

Thereafter, in a case where the UE 10 moves to under the control of the new MME, the UE 10 transmits a Location Registration Request (Attach Request, Tracking Area Update Request, or the like) to the new MME (S211 in FIG. 11).

The new MME that receives the Location Registration Request, requests forwarding of Context of the UE 10, with respect to the old MME (Identification Request, Context Request) (S212 in FIG. 11). In a case of the present exemplary embodiment, a TMSI is not included in the Location Registration Request transmitted in S211 of FIG. 11, but information identifying the UE 10 is included. The new MME uses the information identifying the UE 10 as information for identifying an MSC/VLR for which location registration has been done.

The old MME that receives a request to forward the Context transmits a forwarding response (Context Response) of the Context that includes TMSI, VLR Name, or VLR Number that are held (S213 in FIG. 11).

The new MME that receives a forwarding response of the Context (Context Response) transmits a Location Registration Request to an MSC/VLR identified by the TMSI, VLR Name, or VLR Number included in the forwarding response of the Context (Context Response) (S214 of FIG. 11).

The MSC/VLR performs only updating of a Location Area, since location registration has already been done for the UE 10, and responds with a Location Response (S215 in FIG. 11).

The new MME holds the VLR Name or VLR Number of a transmission source of the Location Response received from the MSC/VLR (S215-1 in FIG. 11). In addition, the new MME responds with a Location Response (Attach Accept, Tracking Area Update Accept, or the like) to the UE 10, based on a Location Registration Response received from the MSC/VLR (S216 in FIG. 11).

As described above, according to the present exemplary embodiment, location registration is performed to a location registration device in which the old MME 211 has actually performed location registration, without going via the UE 10. In the present exemplary embodiment also, for example, it is possible to perform location registration of the UE 10 to the same MSC/VLR, without being affected if a failure occurs in a path between the old MME 211 and the MSC/VLR initially selected by the old MME 211, or a change occurs in the number of MSC/VLRs.

A description has been given above of respective exemplary embodiments of the present invention, but the present invention is not limited to the abovementioned exemplary embodiments, and it is possible to add further modifications, substitutions, and adjustments, within a scope that does not depart from fundamental technological concepts of the invention. For example, in the first to fourth exemplary embodiments described above, descriptions were given of using an NRI as information for identifying an MSC/VLR for which location registration was done, but it is also possible to use a VLR Name or VLR Number as described in the abovementioned fifth exemplary embodiment.

In the same way in the abovementioned fifth exemplary embodiment, it is also possible to use an NRI as information for identifying an MSC/VLR for which location registration was done.

Finally, a described is given of the invention as can be incorporated into the scope of the claims of the present invention.

<First Mode>

A mobile communication system including: a plurality of location registration devices that perform location management of a mobile station on a circuit switching network side; a first packet switching station that, on receiving a Location Registration Request from a mobile station, selects one location registration device from among the plurality of location registration devices in accordance with a prescribed rule and requests location registration; the mobile station that, on moving from under the control of the first packet switching station, transmits a Location Registration Request including information for identifying the location registration device selected by the first packet switching station; and a second packet switching station that makes a request for location registration to the location registration device in which the first packet switching station has performed location registration for the mobile station, based on information included in the Location Registration Request received from the mobile station.

<Second Mode>

The mobile communication system according to the first mode, wherein: the first packet switching station notifies the mobile station of a network resource identifier of a location registration device that performs location registration, and the mobile station transmits a Location Registration Request including the network resource identifier to the second packet switching station.

<Third Mode>

The mobile communication system according to the first mode, wherein: the first packet switching station stores a network resource identifier of a location registration device that performs location registration.

<Fourth Mode>

The mobile communication system according to the first mode, wherein: information for identifying the location registration device selected by the first packet switching station is information for distinguishing the mobile station; and the second packet switching station makes a query concerning a location registration device that performs location registration for a mobile station, which has received a Location Registration Request, with regard to the first packet switching station, and performs location registration for a location registration device that the first packet switching station has responded with.

<Fifth Mode>

The mobile communication system according to the fourth mode, wherein: the first packet switching station uses any of TMSI, VLR Name, or VLR Number, in order to manage a location registration device that performs location registration for a mobile station, which has received the Location Registration Request.

<Sixth Mode>

The mobile communication system according to any of the first to fifth modes, wherein: the plurality of location registration devices forms a Mobile Switching Center/Visitor Location Registrar pool.

<Seventh Mode>

The mobile communication system according to any of the first to sixth modes, wherein: the first and second packet switching stations are either of a Serving GPRS Support Node or a Mobility Management Entity.

<Eighth Mode>

A mobile station that selects one location registration device from among a plurality of location registration devices in accordance with a prescribed rule, and on moving from under the control of a first packet switching station that performs location registration for a mobile station, transmits a Location Registration Request including information for identifying the location registration device selected by the first packet switching station.

<Ninth Mode>

A packet switching station, to which a mobile station is connected, that makes a request for location registration to a location registration device that performs location registration for the mobile station, based on information for identifying a location registration device included in a Location Registration Request received from the mobile station.

<Tenth Mode>

A location registration method for a mobile station, including: a step in which a first packet switching station, on receiving a Location Registration Request from a mobile station, selects one location registration device from among the plurality of location registration devices in accordance with a prescribed rule and requests location registration; a step in which the mobile station, on moving from under the control of the first packet switching station, transmits a Location Registration Request including information for identifying the location registration device selected by the first packet switching station; and a step in which a second packet switching station makes a request for location registration to the location registration device in which the first packet switching station has performed location registration for the mobile station, based on information included in the Location Registration Request received from the mobile station.

The respective disclosures of the Patent Literatures and Non Patent Literatures described above are hereby incorporated by reference into this specification. The exemplary embodiments may be changed and adjusted within the scope of the entire disclosure (including the scope of the claims) of the present invention and based on fundamental technological concepts thereof. Furthermore, a wide variety of combinations and selections of various disclosed elements (including respective elements of the respective claims, respective elements of the respective exemplary embodiments and examples, respective elements of the respective drawings, and the like) is possible within the scope of the claims of the present invention. That is, the present invention clearly includes every type of transformation and modification that a person skilled in the art can realize according to the entire disclosure including the scope of the claims and to technological concepts thereof.

REFERENCE SIGNS LIST

10 UE (mobile station)
21 first switching station
22 second switching station
31 to 3n location registration devices
201, 202 SGSN
211, 212 MME
301 to 30n MSC/VLR

The invention claimed is:

1. A mobile communication system, the system comprising:
 a mobile station;
 a plurality of MSCs/VLRs (Mobile Switching Centers/ Visited Location Registers);
 a first SGSN (Serving GPRS Support Node) or a first MME (Mobility Management Entity); and
 a second SGSN or a second MME;
 wherein said mobile station is configured to receive a TMSI (Temporary Mobile Station Identifier) including an NRI (Network Resource Identifier) indicating one MSC/VLR, from said one MSC/VLR via said first SGSN or said first MME, selected from said plurality of MSCs/VLRs by said first SGSN or said first MME using an IMSI (International Mobile-Station Subscription Identifier), wherein said mobile station is configured to transmit an Attach Request including said TMSI to said second SGSN or said second MME, in a case that said mobile station moves to an area under a control of said second SGSN or said second MME from an area under a control of said first SGSN or said first MME but in an area under a control of said MSC/VLR area; and wherein said second SGSN or said second MME is configured to select said one MSC/VLR based on said TMSI provided by said mobile station.

2. A mobile station used in a mobile communication system including a first SGSN (Serving GPRS Support Node) or a first MME (Mobility Management Entity), a second SGSN or a second MME and a plurality of MSCs/VLRs (Mobile Switching Centers/Visited Location Registers), said mobile station comprising:

a receiver configured to receive a TMSI (Temporary Mobile Station Identifier) including an NRI (Network Resource Identifier) indicating one MSC/VLR, from said one MSC/VLR via said first SGSN or said first MME, selected from said plurality of MSCs/VLRs by said first SGSN or said first MME using an IMSI (International Mobile-Station Subscription Identifier); and a transmitter configured to transmit an Attach Request including said TMSI to said second SGSN or said second MME, in a case that said mobile station moves to an area under a control of said second SGSN or said second MME from an area under a control of said first SGSN or said first MME but in an area under a control of said MSC/VLR area, wherein said second SGSN or said second MME selects said one MSC/VLR based on said TMSI provided by said mobile station.

3. The mobile station according to claim 2, wherein said receiver receives said TMSI by receiving a Location response.

4. The mobile station according to claim 3, wherein said Location response is an Attach Accept.

5. The mobile station according to claim 3 further comprising:

a memory configured to store said TMSI included in said Location response.

6. The mobile station according to claim 2, wherein a request for location registration is transmitted by said second MME or said second SGSN for selecting said MSC/VLR based on said TMSI provided by said mobile station.

7. The mobile station according to claim 2, wherein said MSC/VLR is selected based on said TMSI based NRI after said second MME or said second SGSN receives said Attach Request.

8. The mobile station according to claim 2, wherein said NRI is used for sending data to said one MSC/VLR.

9. The mobile station according to claim 8, wherein said data is corresponding to said Attach Request.

10. A communication method for a mobile communication system, the method comprising:

receiving, by a mobile station, a TMSI (Temporary Mobile Station Identifier) including an NRI (Network Resource Identifier) indicating one MSC/VLR (Mobile Switching Center/Visited Location Register), from said one MSC/VLR via a first SGSN (Serving GPRS Support Node) or a first MME (Mobility Management Entity), selected from a plurality of MSCs/VLRs by said first SGSN or said first MME using an IMSI (International Mobile-Station Subscription Identifier);

transmitting, by said mobile station, an Attach Request including said TMSI to a second SGSN or a second MME, in a case that said mobile station moves to an area under a control of said second SGSN or said second MME from an area under a control of said first SGSN or said first MME but in an area under a control of said MSC/VLR area; and selecting, by said second SGSN or said second MME, said one MSC/VLR based on said TMSI provided by said mobile station.

11. A communication method of a mobile station used in a mobile communication system including a first SGSN (Serving GPRS Support Node) or a first MME (Mobility Management Entity), a second SGSN or a second MME and a plurality of MSCs/VLRs (Mobile Switching Centers/Visited Location Registers), said method comprising:

receiving a TMSI (Temporary Mobile Station Identifier) including an NRI (Network resource Identifier) indicating one MSC/VLR, from said one MSC/VLR via said first SGSN or said first MME, selected from said plurality of MSCs/VLRs by said first SGSN or said first MME using an IMSI (International Mobile-Station Subscription Identifier); and transmitting an Attach Request including said TMSI to said second SGSN or said second MME, in a case that said mobile station moves to an area under a control of said second SGSN or said second MME from an area under a control of said first SGSN or said first MME but in an area under a control of said MSC/VLR area, wherein said second SGSN or said second MME selects said one MSC/VLR based on said TMSI provided by said mobile station.

* * * * *